United States Patent [19]

Castles et al.

[11] Patent Number: 6,157,896

[45] Date of Patent: *Dec. 5, 2000

[54] GEOLOCATION COMMUNICATIONS METHOD DURING VISIBILITY BETWEEN AN EARTH-ORBIT SATELLITE AND A TRANSMITTER AND RECEIVER

[75] Inventors: Milford Pike Castles, San Antonio, Tex.; Austin Walker Boyd, Jr., Fredericksburg, Va.; James Andrew Moryl, San Antonio, Tex.

[73] Assignee: Southwest Research Institute, San Antonio, Tex.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/775,086

[22] Filed: Dec. 30, 1996

[51] Int. Cl.[7] ............................... H04B 7/185; G01S 5/00
[52] U.S. Cl. ........................... 702/95; 701/207; 701/213; 342/357 D; 342/357.06
[58] Field of Search ............................... 702/95; 701/207, 701/213–215; 342/357, 357.1, 367, 357.05, 357.02; 455/427, 428, 440, 456

[56] References Cited

U.S. PATENT DOCUMENTS

| | | | |
|---|---|---|---|
| 4,821,294 | 4/1989 | Thomas, Jr. ............................... | 375/96 |
| 5,043,736 | 8/1991 | Darnell et al. ........................... | 342/357 |
| 5,095,538 | 3/1992 | Durboraw, III .......................... | 455/71 |
| 5,119,504 | 6/1992 | Durboraw, III .......................... | 455/54.1 |
| 5,161,248 | 11/1992 | Bertiger et al. ......................... | 455/17 |
| 5,187,805 | 2/1993 | Bertiger et al. ......................... | 455/12.1 |
| 5,202,829 | 4/1993 | Geier ..................................... | 364/449 |
| 5,365,451 | 11/1994 | Wang et al. ............................ | 702/95 |
| 5,563,607 | 10/1996 | Loomis et al. .......................... | 342/357 |
| 5,678,174 | 10/1997 | Tayloe .................................... | 455/13.1 |
| 5,742,509 | 4/1998 | Goldberg et al. ....................... | 364/449.5 |
| 5,812,932 | 9/1998 | Wiedeman et al. ..................... | 455/13.1 |
| 5,845,206 | 12/1998 | Castiel et al. .......................... | 455/13.4 |

OTHER PUBLICATIONS

M. Pike Castles "Fusion of GPS Technology with Argos for High–Accuracy Location and Tracking Requirements" Paper presented at Argos System Technical Exchange, Sep., 1992.

A. Boyd, M.P. Castles, and J. Moryl "Worldwide Tracking Using GPS–Based Beacons" Paper presented at AIAA Space Programs and Technologies Conference and Exhibit, Sep. 21–23, 1993.

*Primary Examiner*—Kamini Shah
*Attorney, Agent, or Firm*—Taylor Russell & Russell, P.C.

[57] ABSTRACT

A method for determining the geolocation of an object such as a vehicle traversing the earth's surface or airborne thereabove includes employing a device which is capable of operating autonomously to transmit signals to a selected low earth orbit (LEO) satellite for relay to a receiving station whose position is known, identifying the device and its geolocation, speed, altitude and/or heading. The device includes a microcomputer which operates a Global Positioning System (GPS) receiver for receiving GPS signals to identify the device geolocation and the precise time. A nonvolatile memory on board the device stores LEO satellite ephemeris data, satellite operational and message formatting parameters, LEO satellite visibility footprint data and visibility contour information for the device caused by obstacles which are permanently or temporarily in proximity to the device during deployment and which block transmission of signals between the device and the LEO satellite, depending on relative positions. Geolocation information is transmitted to a LEO satellite for relay to the receiving station after calculation of covisibility of the satellite with the receiving station and the transmitter antenna for the device, taking into account the device visibility contour and heading. The device transmitter antenna may have a steering mechanism for causing the antenna to be aimed at a predetermined azimuth and elevation wherein the transmitted signals will be intercepted by the LEO satellite.

62 Claims, 9 Drawing Sheets

GEOLOCATION COMMUNICATIONS METHOD DURING VISIBILITY BETWEEN AN EARTH-ORBIT SATELLITE AND A TRANSMITTER AND RECEIVER

FIELD OF THE INVENTION

The present invention pertains to a method and system for determining the geolocation of an object having a transmitter which transmits geolocation data to a remote receiver by way of a low earth orbit (LEO) relay satellite during periods of covisibility between the satellite, the transmitter and the receiver, and taking into consideration deployment constraints of the transmitter resulting from obstructions which block visibility between the transmitter and the LEO satellite depending on LEO satellite orbit and the particular geolocation or heading of the transmitter at various times.

BACKGROUND

The development of systems of earth orbiting satellites, such as the Global Positioning System, capable of transmitting satellite orbital position and time with great accuracy has resulted in the further development of systems and methods for continuously or intermittently determining the geolocation of a device anywhere on the earth's surface or in an airborne vehicle thereabove.

A system and method have been developed which provides for autonomous operation of a device to determine the geolocation of the device which may be affixed to a vehicle, or hand carried by a person, and which is adapted to transmit the geolocation information by way of a LEO satellite to a remotely located receiving station, typically stationary on the earth's surface or possibly in an airborne vehicle, for example. Copending U.S. patent application Ser. No. 08/774,604 filed Dec. 30, 1996 and entitled: "Autonomous Geolocation and Message Communication System and Method" describes and claims several features of a system of the above-mentioned type and is assigned to the assignee of the present invention.

The invention described and claimed in the above-referenced patent application is operable to utilize signals transmitted by the satellite array or constellation of the Global Positioning System. The high earth orbit of the Global Positioning System (GPS) and the number of satellites deployed provides for communication of signals to a device in virtually any location on the face of the earth or in an airborne vehicle at any time to enable the device to determine its geolocation. However, the process of relaying geolocation information and other messages from the autonomous device to a remote receiving station by way of a selected LEO satellite can require additional considerations.

The particular LEO satellite selected for transmission of geolocation information to a remote information receiving station for monitoring or tracking the device will typically have certain visibility limitations, depending on the satellite orbital path and the position of the geolocation device transmitter at the time of desired information transmission. In order to minimize delays in transmitting data from the device to the receiving station, the relay LEO satellite must have covisibility with the transmitter and the receiving station to be able to relay the geolocation information without delay and without requiring storage of the information in suitable circuits on the satellite itself. Many LEO satellites may, of course, not have any capability for storing such information. Accordingly, covisibility between a particular LEO satellite, the autonomous device and the receiving station is mandatory.

Other considerations which must be taken into account when deploying a system as described in the above-referenced patent application include deployment constraints on the geolocation device including its transmitter. Depending on the geolocation transmitter position, certain obstacles, such as natural or manmade structures or electrical or magnetic fields, for example, may block "visibility" between the LEO satellite and the geolocation transmitter. Accordingly, it is important for the transmitter to know when the LEO satellite to which it is transmitting will be truly visible for signal transmission so as to avoid signal interruptions and resulting in incomplete information being transmitted to the receiving station. If the geolocation device transmitter is disposed on a vehicle, the obstructions which would limit visibility between the transmitter and a LEO satellite can also be dependent on the vehicle course or heading.

Accordingly, the present invention contemplates a geolocation communication system and method which takes into account the limitations on visibility of a receiver for geolocation information being transmitted from a geolocation communications device, and controls operation of the device to avoid transmission of signals during periods when such transmissions may be blocked before reaching the relay satellite or the information receiving station.

SUMMARY OF THE INVENTION

The present invention provides an improved geolocation and message communication system and method including employment of an autonomous geolocation transmitter which is operable to transmit, via a selected LEO satellite, geolocation information to a receiving station during periods of covisibility between the LEO satellite, the transmitter and the receiving station and when the geolocation transmitter is not constrained from having visibility with the LEO satellite due to natural and manmade structures or other obstacles which may block visibility between the satellite receiver and the geolocation transmitter.

In accordance with one aspect of the present invention, a method for transmitting geolocation information and other messages from a transmitter or device is provided wherein LEO satellite ephemeris data, the geolocation of the transmitter and the geolocation of the receiving station are taken into consideration and transmission of information is attempted only when the satellite is "visible" to both the geolocation transmitter device and the receiving station. In particular, the method of the invention contemplates that the geolocation transmitter device is operable to autonomously determine both the geolocation of the device and the receiving station and transmits geolocation information and other data to the LEO satellite only when the satellite visibility footprint covers or encompasses both the geolocation transmitter device and the receiving station. Accordingly, an optimum time for communicating geolocation information and other messages to the receiving station is determined, based on the geolocation of the transmitter, the geolocation of the receiving station and ephemeris data for the next satellite which will be covisible, or a selected satellite during its period of covisibility.

In accordance with another aspect of the present invention, a geolocation communications system and method is provided which is operable to transmit geolocation information to a LEO satellite during periods of visibility of the satellite with a geolocation transmitter as determined by information stored in a device which includes a digital data processor operably connected to the transmitter and which identifies certain obstacles, such as part of the structure on which the geolocation transmitter is disposed or adjacent thereto and compares a window or contour of visibility of the device defined by the obstacles to satellite ephemeris data to determine when the satellite will be visible to the device. The effect of the obstacles on satellite visibility may also take into account the position or heading of the device and the associated obstacles with respect to satellite ephemeris data from which satellite orbital path, azimuth and elevation information may be determined. In this way, optimum signal transmission times may also be determined and possibly also resulting from dynamically changing deployment constraints on transmissions from the transmitter device.

The present invention also provides a system and method for determining the geolocation of a device utilizing LEO satellites for relaying geolocation information and other messages to a receiving station wherein the device includes a steerable antenna, said antenna having a particular signal transmitting pattern and wherein the antenna is positioned to optimize transmission of signals to a LEO satellite based on a predetermined expected position of the LEO satellite and utilizing stored ephemeris data for the LEO satellite and the geolocation of the device and the antenna.

The present invention still further provides an improved system and method for determining and monitoring the geolocation of an object wherein the system includes a computer-controlled receiver and transmitter operable to receive signals from a satellite system which enable the transmitter to calculate its geolocation, determine the optimum time to transmit geolocation information and enhance the accuracy and completeness of the transmitted signal to a LEO satellite.

Those skilled in the art will further appreciate the above-mentioned advantages and superior features of the invention together with other important aspects thereof upon reading the detailed description which follows in conjunction with the drawing.

DESCRIPTION OF THE PREFERRED EMBODIMENTS

In the description which follows, like elements are marked throughout the specification and drawings with the same reference numerals, respectively. The drawing figures are not intended to be to scale and many elements in the drawing figures are shown in schematic or somewhat generalized form in the interest of clarity and conciseness.

Figure 1:
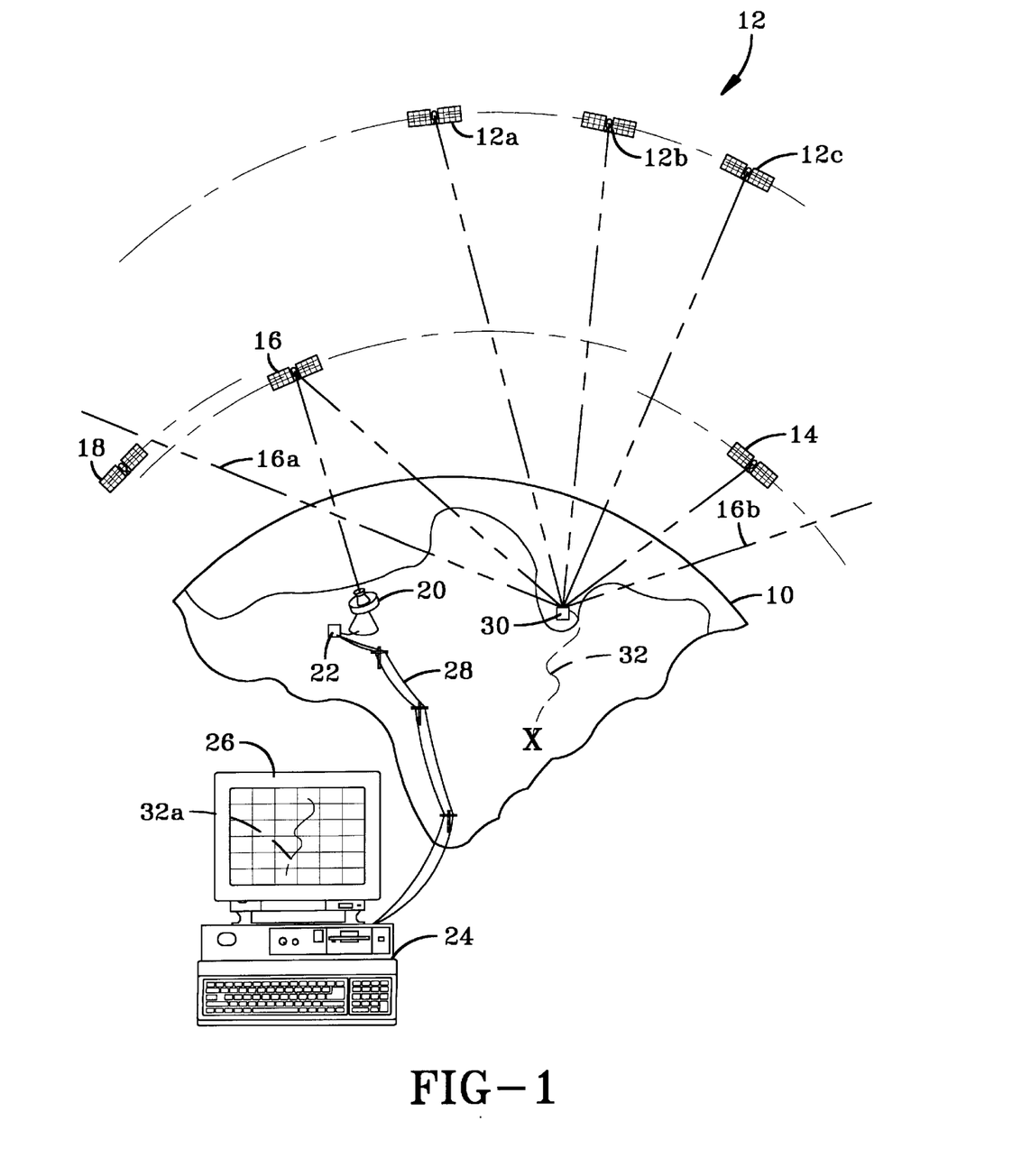
FIG. 1 is a schematic diagram of an autonomous geolocation and message communication system in accordance with the present invention.

One embodiment of a system for carrying out the method of the present invention is illustrated in FIG. 1. Referring to FIG. 1, there is depicted a schematic diagram of a portion of the earth 10 and a constellation of orbiting bodies or satellites, generally indicated by numeral 12. The satellite constellation 12 includes plural satellites 12a, 12b and 12c, by way of example, which are deployed spaced apart from each other in a relatively high orbit about the earth 10, in a range of about eleven thousand miles above the earth's surface, and having a period of about twelve hours each. Only three satellites are shown in the constellation 12 although a much greater number may be deployed. For example, the satellite constellation 12 may comprise the Global Positioning System including a total of twenty-four satellites, including three operational spares, deployed in the orbit mentioned above. For sake of discussion with regard to this invention, the satellite constellation 12 will be assumed to comprise the Global Positioning System. However, the method of the invention may use other satellites capable of transmitting their precise orbital position and precise time on a continuous or scheduled basis. A more detailed discussion of the Global Positioning System (also known as the NAVSTAR/Global Positioning System) is set forth in U.S. Pat. No. 4,821,294, issued Apr. 11, 1989 to J. B. Thomas, Jr.

Also depicted in FIG. 1 are plural satellites 14, 16 and 18, for example, which are disposed in much lower orbits, and are commonly known as low earth orbit or LEO satellites. LEO satellites are typically deployed in orbits in a range of altitudes of about four hundred miles to eight hundred miles above the nominal surface of the earth 10. The satellites 14, 16 and 18 may have individual orbits in the above-mentioned range and there may be one or more constellations of plural satellites in essentially the same orbit, spaced apart from each other. The orbital path of each satellite 14, 16 or 18 may vary with each orbit. Each of the satellites 14, 16 and 18 may be provided with suitable on-board receiving and transmitting apparatus for receiving and transmitting electromagnetic radiation signals, preferably in a microwave or radio frequency (RF) range. Each satellite 14, 16 and 18 may employ a suitable identifier code required to activate its transmitting equipment for relaying information received from a remote transmitter to a receiver on the earth's surface.

For example, as shown in FIG. 1, a signal receiving antenna 20 is disposed on the earth's surface and is connected to a suitable information receiving and processing terminal 22 which may be in communication with an information receiving, processing and display apparatus, such as a computer or central processor unit 24 having a suitable visual display device or monitor 26 associated therewith. Communication between the terminal 22 and the processor 24 may be via conventional land telephone communication lines 28, or other communications links known to those skilled in the art, for transmitting information electronically.

The terminal 22 and processor 24 may be at a common location or remote from each other and considered, collectively, an information receiving and monitoring station. The antenna 20, receiver terminal 22 and processor 24 may also be disposed on a surface or airborne vehicle whose position changes from time to time.

Referring further to FIG. 1, a device 30 is shown disposed essentially on the earth and traversing a predefined or random course 32, although the device 30 may be stationary at any particular time. The device 30 may, for example, be hand carried by one or more persons, or be disposed on a surface vehicle including a land based vehicle or a marine surface or submersible vessel, or the device 30 may be on board an aircraft operable in the lower atmosphere or in a path which may take it into orbital or suborbital flight.

In accordance with the invention, the device 30 includes means for receiving signals from the satellites 12a, 12b and 12c, for example, from which signals the device 30 is able to determine its geolocation, that is longitude and latitude. Still further, the device 30 may be capable, with the information transmitted to it by the satellites 12a, 12b and 12c, of determining its speed, altitude and its course or heading with respect to the navigation coordinates provided by the system of longitude and latitude lines of position. Still further, the device 30 is capable of referring to ephemerides or ephemeris data stored in the device to determine, based on the geolocation of the device, when the next available LEO satellite 14, 16 or 18, for example, will be visible to the extent that signals may be transmitted from the device 30 to the selected satellite for relay to the base station or terminal 22, including the signal processor 24 and the display 26 wherein the position of the device 30 may be intermittently or continuously tracked.

By way of example, the visual display 26 shows a track 32a representing the course 32 of the device 30 as it moves along the surface of the earth 10, for example. Accordingly, the invention contemplates enabling a virtually continuous or at least frequent determination of the position of an object on the earth by a remote tracking station which includes the processor 24. Clearly, multiple devices 30 may continuously, or at high frequency, determine their geolocation and transmit information identifying such geolocation or other data to the terminal 22 and processor 24 so that a comparison of the location of multiple objects may be made. As mentioned previously, the device 30 may be hand-held by a person carrying the device or the device 30 may be mounted on a surface vehicle or aircraft which is stationary or in motion.

FIG. 1 further illustrates, by way of example, the limits of visibility of the satellite 16, for example, as indicated by lines 16a and 16b. The lines 16a and 16b may define the included angle of the range of visibility of satellite 16 which may require to be so many degrees above the horizon when approaching the device 30 or when receding from the device 30, and not taking into account any other constraints on visibility. The angles between lines 16a and 16b and the horizon seen by device 30, respectively, may comprise so-called mask angles which define regions with respect to device 30 in which the satellite 16 is not "visible" to the device 30. Of course, if the satellite 16 is over the horizon it is, normally, also considered to be not visible. Depending on the orbit of the satellite selected for transmitting signals to the terminal 22, the range of the visibility may, of course, vary due to natural and manmade obstacles on the earth, or in proximity thereto.

Moreover, the position of the LEO satellite selected for communication of signals, with respect to the antenna 20, for relay to the terminal 22 may also be required to be determined. Each satellite 14, 16 and 18 has a visibility "footprint" which moves across the face of the earth as the satellite traverses its orbit, as will be described in further detail herein. Accordingly, the device 30 is also adapted to store the geolocation data and other information it desires to transmit to the selected LEO satellite until the calculated time when that satellite becomes visible. At such time the device 30 is then "awakened" to transmit the stored information at an optimum time. Alternatively, the device 30 may be operable to select a LEO satellite, such as any one of the satellites 14, 16 and 18 that is visible at a predetermined desired time or times, for transmission of signals for relay to the terminal 22 and that satellite is employed for the signal relay operation.

Figure 2:
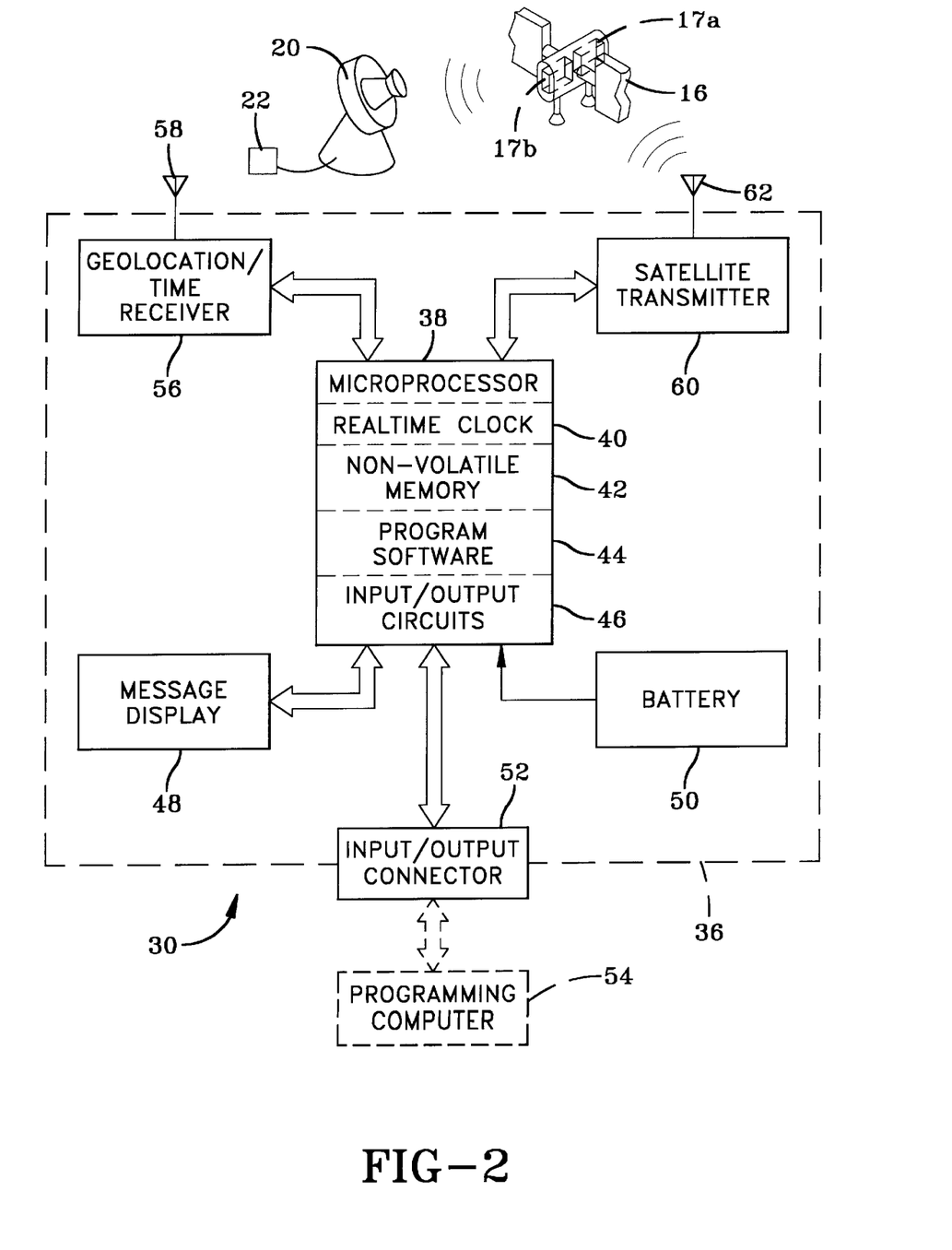
FIG. 2 is a generalized schematic diagram of the autonomous geolocation and communication device for the system shown in FIG. 1.

Referring now to FIG. 2, a generalized schematic diagram of the device 30 is shown wherein the device may include a casing 36 in which a suitable microcomputer or microprocessor 38 is disposed and is operably connected to a real time clock 40, and a nonvolatile memory 42, all of which are operable in conjunction with program software 44 for carrying out the operations described herein. Suitable input/output circuits 46 are provided for connection to a message display 48, a power source, such as a battery 50, and an input/output connector 52 mounted on casing 36 for connection to a programming computer 54 and an external power source, not shown. The device 30 also includes a suitable circuit comprising a geolocation data and time signal receiver 56 operably connected to an antenna 58 for receiving signals from the satellite constellation 12 to enable the device 30 to calculate its geolocation with respect to the earth 10. The receiver 56 is also operably connected to the microprocessor 38.

Still further, the device 30 includes a suitable microwave or RF signal transmitter 60 operably connected to an antenna 62 for transmitting information or "messages", such as the geolocation of the device 30 and suitable activating information to a receiver and transmitter system on board the selected LEO satellite, such as satellite 16, shown schematically in FIG. 2. Satellite 16 has a suitable signal receiver 17a operably connected to a transmitter 17b on board and operable for receiving signals from the antenna 62 and transmitting signals to the antenna 20 and terminal 22 of the receiving station.

Figure 3:
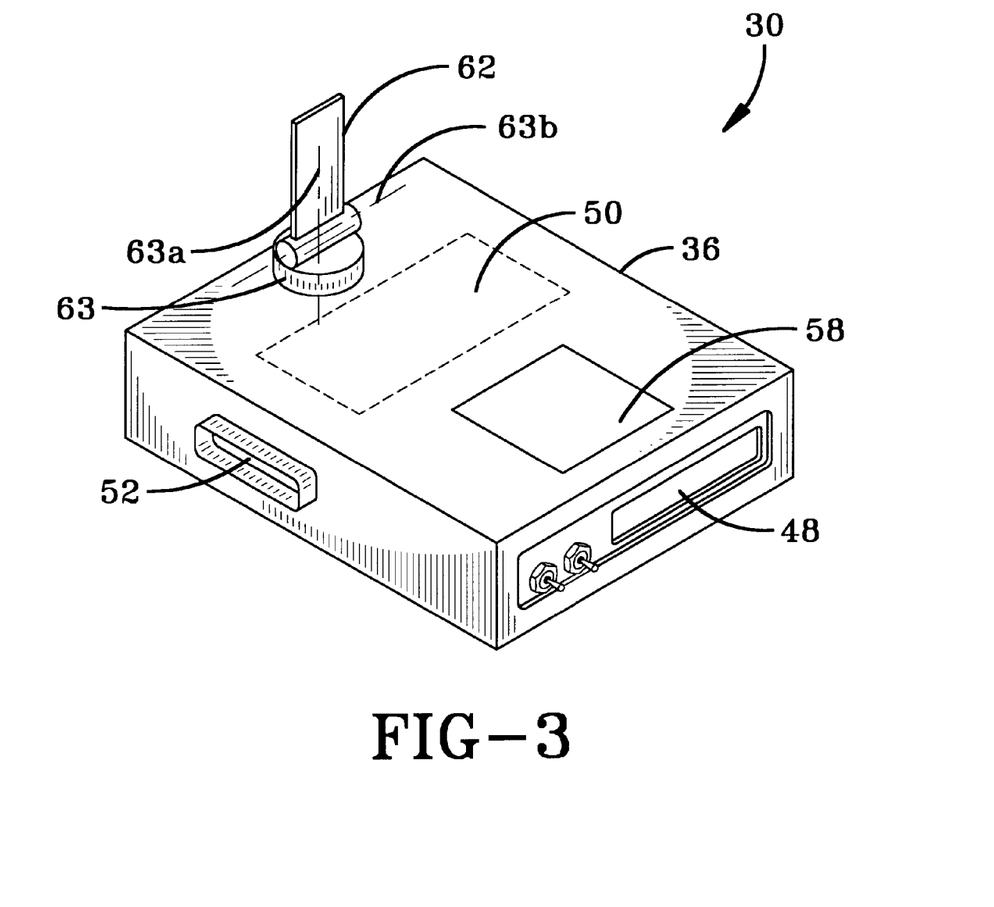
FIG. 3 is a perspective view of one embodiment of the device illustrated schematically in FIG. 2.

The invention contemplates that the device 30 may be substantially self-contained within a relatively small, generally rectangular box-like casing 36, as shown in FIG. 3, wherein a suitable message display 48 is provided along one side of the casing, the input/output connector 52 is provided along another side of the casing. A suitable compartment for housing battery 50 is also provided within the casing 36. The respective antennas 58 and 62 may be oriented along the top of the casing, as shown.

Although the device 30 may be physically small enough to be hand carried, the device 30 may also be secured to suitable structure on a vehicle or other portable structure. If the device 30 is hand carryable, during operation it may be desirable to place the device on a stationary surface so that a unique feature of the system and method may be enjoyed.

Referring further to FIG. 3, the device 30 is provided with a suitable steering mechanism 63 for the antenna 62 which may permit essentially omnidirectional movement of the antenna 62 about mutually perpendicular axes 63a and 63b, for example. In this way, the antenna 62 may be provided with a suitable directional antenna pattern to enhance its signal transmitting capabilities and the directivity of the antenna pattern may be aimed at the satellite receiving antenna to improve signal transmissivity between the device 30 and a selected LEO satellite. The antenna steering mechanism 63 may utilize conventional actuators suitably connected to a controller, all not shown in FIG. 3, for receiving antenna steering commands to position the antenna 62 in the desired orientation in accordance with one aspect of the invention to be described in further detail herein.

Figure 4:
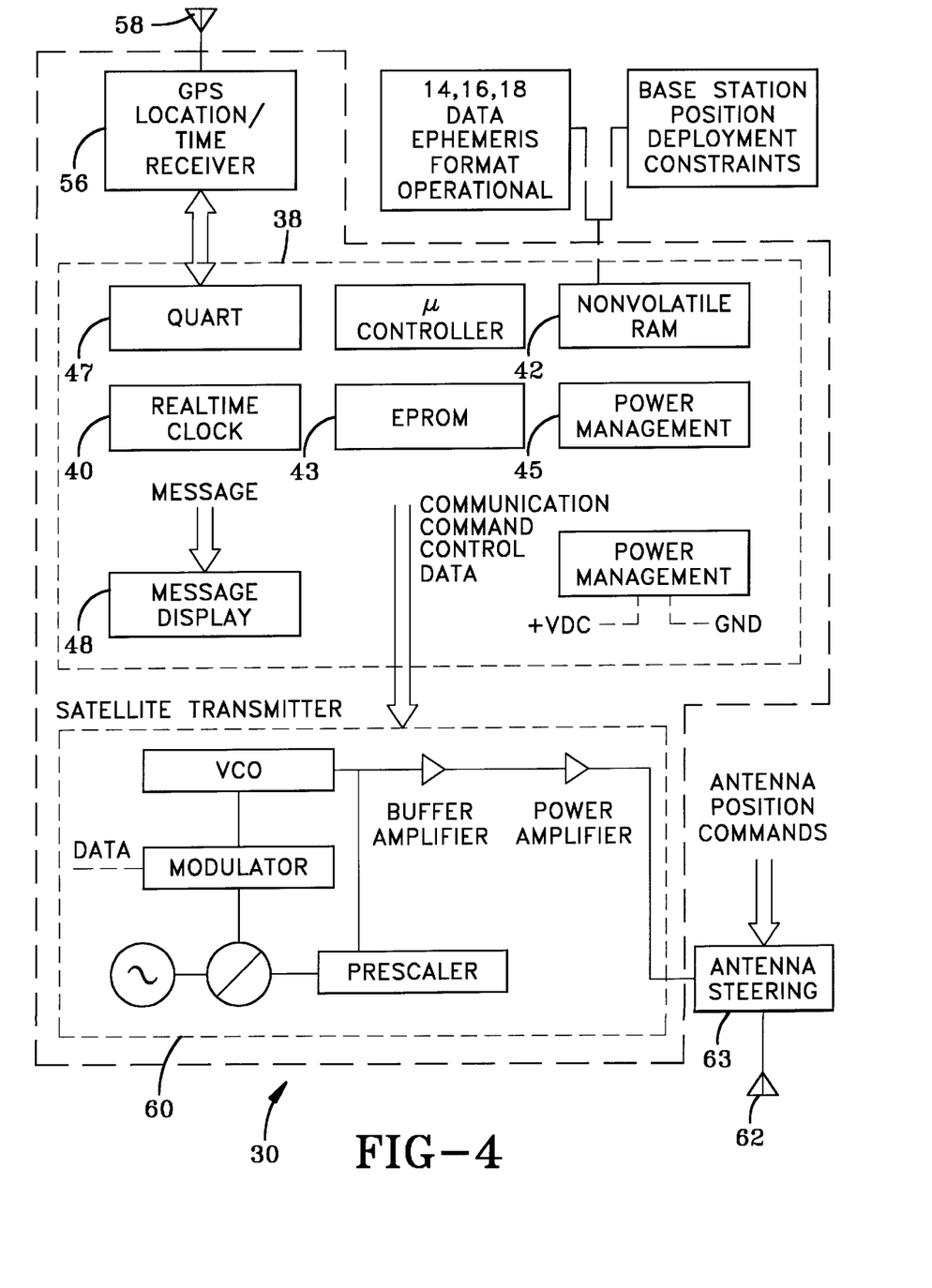
FIG. 4 is a schematic diagram of the device illustrated in FIGS. 2 and 3 in somewhat greater detail.

FIG. 4 is a more detailed schematic diagram of the device 30 showing certain features of the transmitter 60 and the microprocessor 38. The microprocessor 38 includes the real time clock 40, the nonvolatile memory 42, an EPROM 43 and power management circuitry 45. The microprocessor 38 is also operably connected to a quad universal asynchronous receiver/transmitter 47 which interfaces with the receiver 56.

The microprocessor 38 may be suitably programmed to provide antenna position commands to the steering mechanism 63 based on the position of the device 30 with respect to the next available LEO satellite during its time of visibility to the device 30, or a preselected satellite when it is visible and in a suitable position for relay of information to the terminal 22, for example. FIG. 4 further illustrates ephemeris data for each of the satellites 14, 16 and 18, labelled "ephemeris" and which is stored in the nonvolatile memory 42. Data stored in the memory 42 includes LEO satellite ephemeris data, any message formatting requirements, coding or decoding requirements and power and/or satellite receiver operating frequency and data rate requirements for communicating with the particular LEO satellite to which information is to be transmitted for relay to the terminal 22. Ephemeris data may be accurate for several months or longer depending on LEO satellite orbit behavior.

FIG. 4 also indicates other data which may be stored in the nonvolatile memory 42, including the geolocation position of the base or receiving station comprising the antenna 20, the terminal 22 and the processor 24, and information regarding so-called deployment constraints of the device 30. Deployment constraint information includes position related information for the device 30 wherein obstructions which affect the range of visibility of the device may reduce the range of visibility depending on device location or heading. For example, even though the device 30 may, in a noncongested environment, have a range of visibility as indicated by the lines 16a and 16b in FIG. 1, if the device is deployed on a vehicle, certain structural features of the vehicle or radiation or magnetic fields associated with the vehicle or structures may adversely affect the range of visibility of the device. This range of visibility limitation may be characterized as a visibility window having a particular contour characteristic for the device 30 in its particular environment. The visibility contour may also be affected by the position and heading of the device with respect to the particular LEO satellites with which the device 30 is expected to communicate.

Prior to placing the system of the invention, including the device 30, in operation the processor 38 is initially configured or programmed by a programming computer 54 to carry out the method of the invention and the computer or processor 54 is then disconnected so that the device 30 is operable to perform all of its functions under autonomous and automatic control. Initial programming of the processor 38 includes loading into the memory 42 data regarding decision making algorithms, operating instructions and ephemeris data for the satellites 14, 16 and 18 information regarding the receiving or base station geolocation or expected time based geolocations of the station, and device deployment constraints. The processor 38 is then activated by the clock 40 at predetermined times to begin a sequence of operations which includes powering up of the receiver 56 and its antenna 58 to acquire measurements from the satellite constellation 12, including the satellites 12a, 12b and 12c or however many satellites are required, to determine the geolocation of the device 30.

Figure 5:
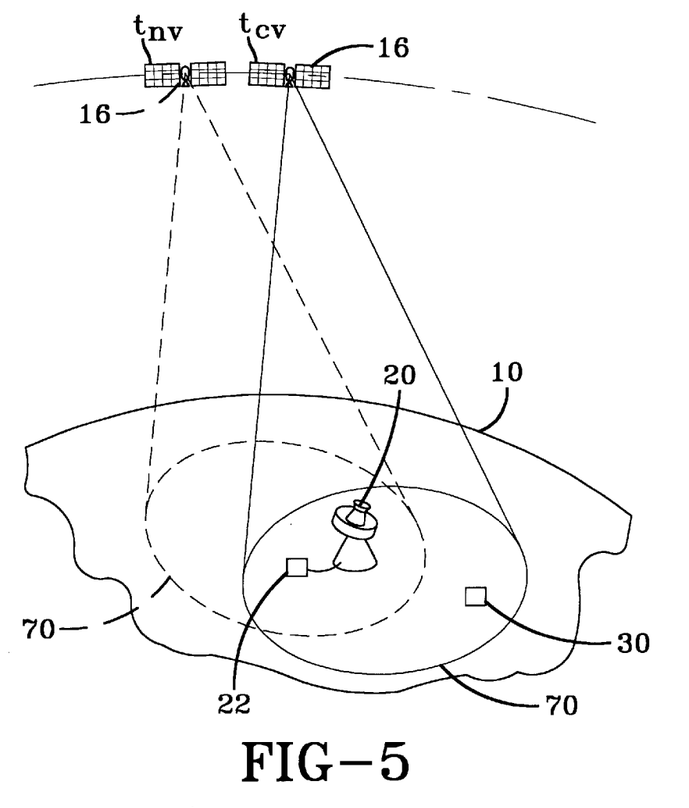
FIG. 5 is a diagram illustrating the covisibility of a LEO satellite with the geolocation device and a receiving station.

Referring now to FIG. 5, there is illustrated, schematically, one feature of the method of the invention wherein the device 30 is capable of determining whether or not a LEO satellite, such as the LEO satellite 16, has covisibility with the device 30 and the information receiving station, including the antenna 20 and the terminal 22. FIG. 5 illustrates an area on the earth's surface, commonly referred to as a footprint 70, within which RF communications between a transmitter or receiver, generally on the earth's surface, and the satellite 16 may take place without the risk of loss of communication or interference therewith. The communications footprint of a LEO satellite may be predetermined based on satellite orbit and other operating characteristics such as its transmitter and/or receiver antenna pattern, for example. Typically, for a LEO satellite, a footprint is generated having a diameter of about five thousand kilometers and which, of course, moves across the face of the earth as the satellite orbits thereabove. If the LEO satellite does not have the capability of storing received signals or the ability to calculate when it is in a position to transmit to a particular receiving station, this capability must be available to the transmitter which is using the LEO satellite as a relay device for communicating with a receiving station such as the terminal 22.

In accordance with the present invention, data with respect to the characteristics of each LEO satellite 14, 16 and 18, for example, includes information regarding the shape and/or diameter of that satellite's visibility footprint. This information together with the ephemeris data for the particular satellite stored in the processor 38, for example, enables the device 30 to determine when it is within the footprint 70 of satellite 16. Moreover, since the device 30 knows its geolocation and may be preprogrammed or receive information regarding the geolocation of the antenna 20 and terminal 22, the processor 38 is also operable to determine when the satellite 16 is visible to both the device 30 and the station represented by the antenna 20 and terminal 22, as satellite 16 orbits above the earth. Signal transmissions to the satellite 16 for relay to the terminal 22 are then carried out when the device 30 has determined that covisibility exists. Accordingly, the diagram of FIG. 5 indicates that at a particular time $t_{nv}$, satellite 16 is visible to the terminal 22 but not to the device 30 whereas at time $t_{cv}$ there is covisibility between the LEO satellite 16, the device 30 and the terminal 22. Of course, the device 30 may be in a position where covisibility between it and a particular LEO satellite will not occur and in such instance the processor 38 will query the ephemeris data for all satellites whose data is stored in the memory 42 until a satellite is identified which will within predetermined time limits, for example, have covisibility with the device 30 at its particular position in question and the receiving station represented by the antenna 20 and terminal 22.

Figure 6:
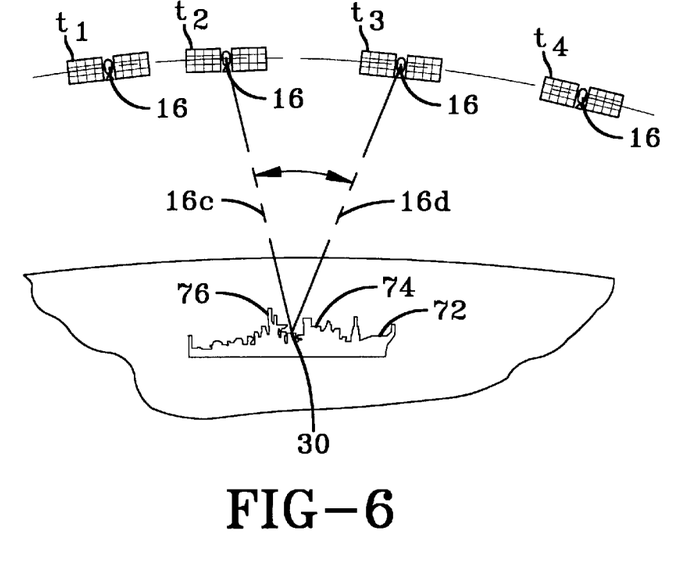
FIG. 6 is a diagram illustrating one application of a transmitter device on a vehicle wherein device deployment constraints limit satellite visibility.

Referring to FIG. 6, another consideration which the device 30 is capable of dealing with relates to so-called deployment constraints of the device wherein the device is disposed on or near an obstacle which reduces visibility between the device and a particular LEO satellite as that satellite otherwise becomes visible to the device. For example, the device 30 may be on board a vehicle, such as a ship 72 and the placement of the device on the ship 72 may, for various reasons, be such that portions of the ship superstructure 74 and 76, for example, reduce the visibility of the device with respect to the satellite 16. Other devices on ship 72 may produce electrical or magnetic fields which may interfere with the visibility or "viewing" range of device 30. Since the placement of the device 30 on the ship 72 may be fixed, a window of visibility of the device, taking into consideration the superstructure 74 and 76, for example, may be determined with respect to a particular satellite depending on the heading of the ship and its geolocation. Accordingly, visibility between the device 30 and a satellite will vary, depending on the position of the ship 72 and its heading. For example, the apogee of an orbit of the satellite 16 with respect to the device 30 in a particular position of the device may be such that essentially no time will be available during an orbital pass of the satellite to provide for reliable communication between the device 30 and the satellite if a portion of the superstructure 74 or 76 will continually block visibility between the satellite and the device.

On the other hand, the ship 72 may be in a position, and have a particular heading, which will allow a substantial period of time for communication between the device 30 and the satellite 16. The limits of visibility illustrated in FIG. 6 are indicated by the lines 16c and 16d. Accordingly, between times $t_2$ and $t_3$, device 30 may transmit information to satellite 16 for relay to station 20, 22 if covisibility exists between the device and the station as also determined by the processor 38. Therefore, the processor 38, upon determining a particular geolocation for the device 30, when deciding which LEO satellite to transmit to, queries the memory 42 for ephemeris data for a selected number of satellites, for example, to determine which satellite will present its footprint to the device at the desired time and if there will be covisibility between the device and the signal receiving station and further wherein, for the particular position of the device, if deployment constraints such as the ship's superstructure will effectively reduce the range of visibility of the device so as to limit signal transmission times or substantially eliminate signal transmission times for a particular satellite.

Figure 7:
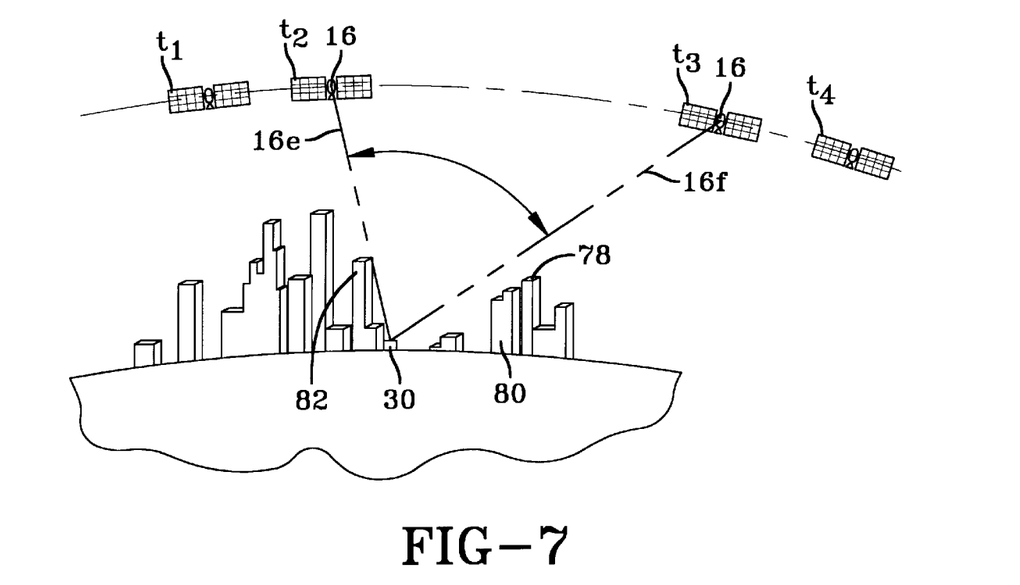
FIG. 7 is a diagram, similar in some respects to FIG. 6, showing device deployment constraints resulting from obstructions such as buildings in an urban environment.

Referring now to FIG. 7, there is illustrated another example of a deployment of the device 30 wherein structures such as buildings 78, 80 and 82, for example, will limit the range of visibility and times when the device 30 may transmit signals to a LEO satellite such as the satellite 16. The angle between lines 16e and 16f, for example, show the limits of the range of visibility of the device 30 with respect to satellite 16 such that any time between times $t_2$ and $t_3$, reliable signal transmissions may be carried out between the device 30 and the satellite.

Figure 8:
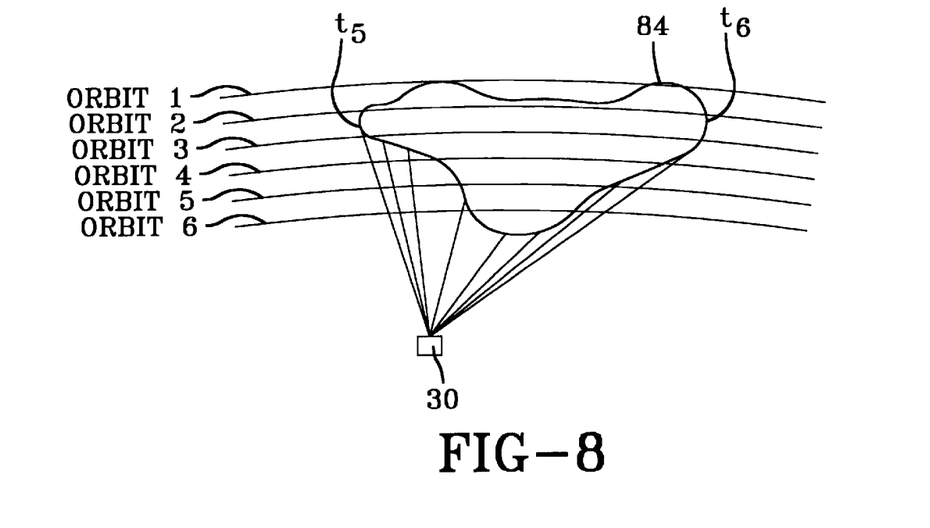
FIG. 8 is a diagram illustrating a satellite visibility window or contour and showing multiple satellite ground tracks that pass through the visibility contour.

FIG. 8 illustrates a visibility window having a contour 84 for the device 30 in the environment depicted in FIG. 7, for example. Since the orbital tracks on the earth for a satellite, such as the satellite 16, may be predetermined, as indicated by orbit nos. 1 through 6 in FIG. 8, the processor 38 may be able to select the optimum times to transmit information from the device 30 to the satellite. For example, during orbit no. 2, satellite 16 will be visible to the device 30 between times $t_5$ and $t_6$. Visibility between device 30 and satellite 16 during orbit no. 1 occurs only for two very brief periods of time interrupted by a period of nonvisibility. Visibility between device 30 and satellite 16 during orbit nos. 3 through 6 is progressively reduced as indicated by the contour line 84 and the respective orbital tracks of orbit nos. 3 through 6. Accordingly, a comparison of satellite ephemeris data with a visibility window or contour for the device 30 may be made for a particular geolocation of the device 30 to determine the optimum times, if any, when satellite visibility will permit reliable signal transmission from device 30 to the satellite for relay to a receiving station. The times when visibility between the device 30 and the LEO satellite are sufficient for reliable signal transmission must then be compared with the times when covisibility between the satellite and the receiving station and the device 30 exists before information is transmitted from the device 30 to the LEO satellite for relay to such receiving station.

Once it has been determined that covisibility is present between the device 30 and a receiving station, such as the terminal 22, the orbital path of the LEO satellite, which is known, from the calculations performed to determine the times of covisibility, may be used to provide steering commands to the steering mechanism 63 so that the antenna 62 is positioned optimally for transmission of signals from the device 30 to the particular LEO satellite in question. In this regard, the elevation and azimuth of the LEO satellite during that portion of its orbital path or track when covisibility exists may be determined and used for issuing appropriate steering commands to the mechanism 63.

Figure 9:
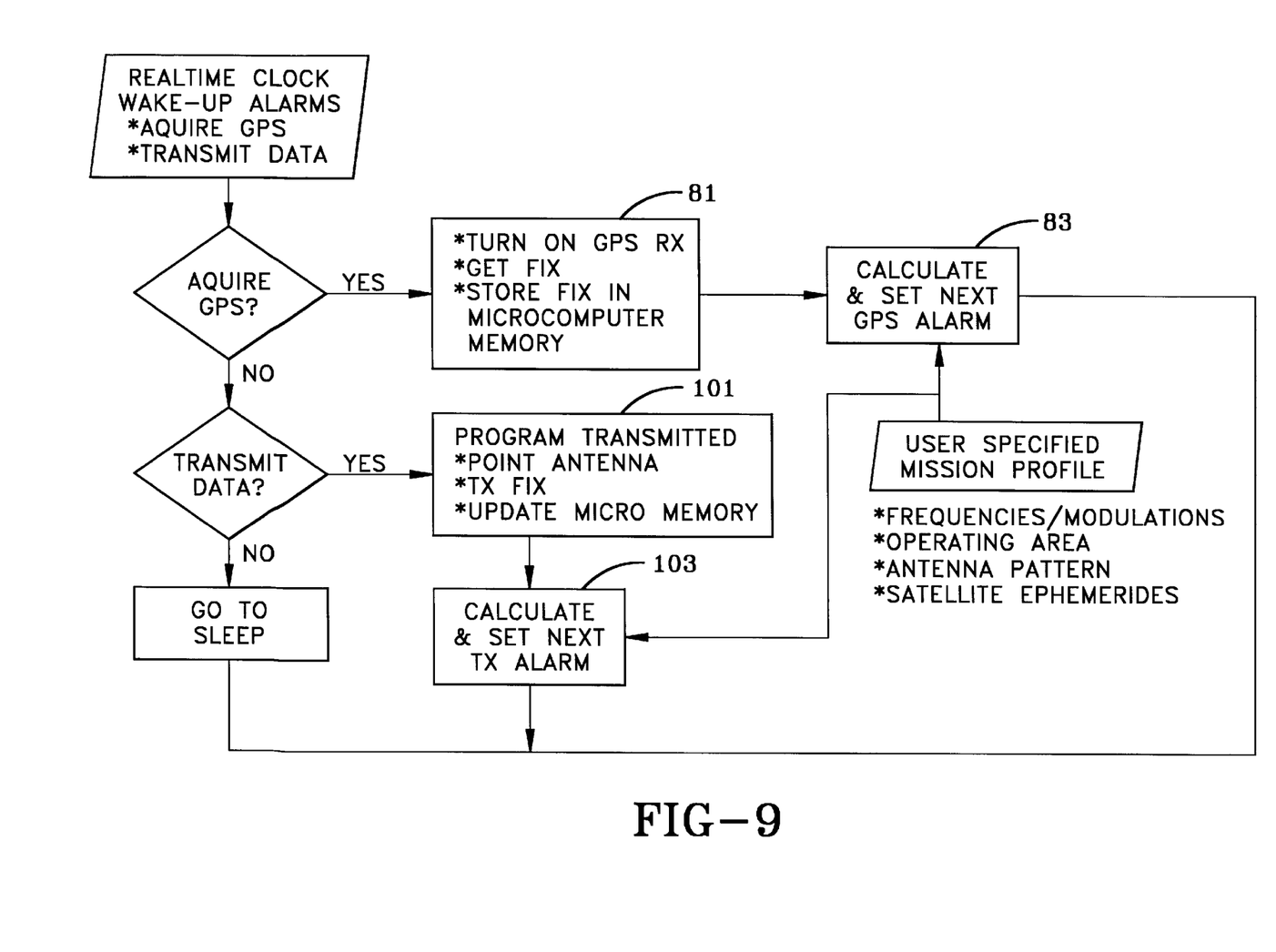
FIG. 9 is a generalized flow diagram of the method and system of the invention.

FIG. 9 illustrates, in general, the steps carried out by the device 30 in a typical operating sequence. FIG. 9 also illustrates certain of the input information which is supplied to the processor 38 to enable the device 30 to carry out the method of the invention. For example, as illustrated in FIG. 9, the device 30 may have a particular mission which requires transmission of its geolocation and other information at specified times and only if in specified locations and utilizing only specified LEO satellites for relay of the information to a receiver station, such as the terminal 22. One or more terminals 22 and antennas 20 may be employed. In this regard, information regarding the general operating area in which the device 30 is to be located before transmission of signals occurs, would be entered into the processor 38, along with information pertaining to characteristics of antennas, particularly the antenna 62, ephemeris data regarding the LEO satellites through which information is to be relayed and device deployment constraint data, which may be permanently disposed in memory 42 if the device 30 is in a fixed position on ship 72, for example.

By way of example, it may be assumed that the device 30 is disposed on ship 72, whose geolocation is to be reported as often as possible, utilizing particular LEO satellites for relaying the geolocation of the ship to a receiving and tracking station including the terminal 22 and the processor 24, whereby tracking of the ship may be monitored continuously and with substantial accuracy. The ephemeris data regarding the LEO satellites to be used may, depending on the position of the ship 72 on the earth's surface, also define the mask angles.

Accordingly, the method of the invention contemplates, by way of example, the following process, assuming that the device 30 has the requisite information stored on board in the processor 38 and its associated memories. A predetermined interval is selected for powering up the receiver 56 and its antenna 58 to receive precise time and position measurement signals from the satellite constellation 12. The processor 38 normally synchronizes its clock with the time signal from satellite constellation 12. Signals are received from the satellite constellation 12, a geolocation or position "fix" is acquired and the information regarding this fix, including longitude and latitude, speed and heading is stored in one of the processor memories as indicated in step 81, FIG. 9. Upon acquisition of a position "fix" the receiver 56 may be powered down and the processor 38 calculates and sets an alarm signal for repowering up the receiver 56 and acquiring another position fix, as indicated at step 83.

The processor 38 is also then operated to query the ephemeris data for the respective LEO satellites which have been preprogrammed for consideration for use as receivers and for relay of information transmitted from the device 30. For example, the processor 38 may be programmed to select the next available LEO satellite which will be visible a sufficient amount of time and in a sufficiently useful position to receive information from the device 30. By way of example, it will be assumed that the processor 38 will query the memory 42 to determine, from ephemeris data stored therein, when the next visible LEO satellite will be in a position to receive signals from the transmitter 60.

Figure 10:
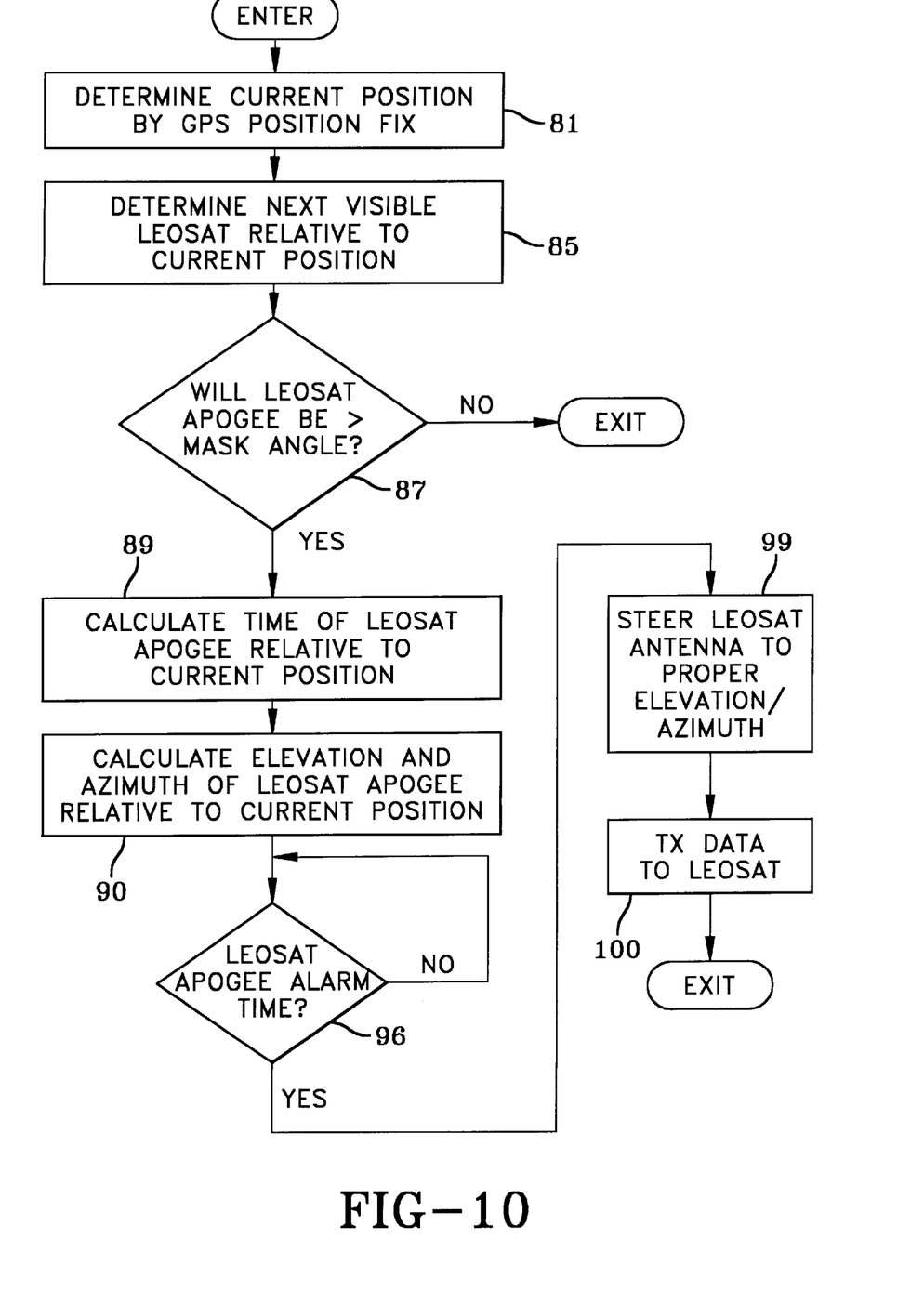
FIG. 10 is a flow diagram showing the steps in determining satellite position for steering a steerable transmitter antenna to the proper elevation and azimuth.

Referring to FIG. 10, for example, upon determining the current position by a GPS position fix, as shown in step 81, the processor 38 then determines the next visible LEO satellite relative to its current position as indicated in step 85. The processor 38 then determines whether or not the next LEO satellite will have an apogee greater than the mask angle, step 87, for that satellite for the current position or anticipated position of the device 30 when the next visible LEO satellite becomes "visible." If the LEO satellite in question will reach a point above the horizon which is greater than its mask angle, the processor 38 then calculates the time of the LEO satellite apogee or a position of the LEO satellite relative to the current position of the device 30 which will enable transmission as indicated at step 89. If the LEO satellite in question will not become truly "visible" for signal transmission at step 87, the processor 38 may query the ephemeris data for all LEO satellites under consideration for transmission of signals thereto to determine when another satellite will become the next visible satellite.

After calculating the time when the next visible LEO satellite will reach its apogee relative to the current position of the device 30, the processor 38 may also calculate the elevation and azimuth of the LEO satellite apogee also relative to the current position of the device 30, as indicated at step 90.

Figure 11:
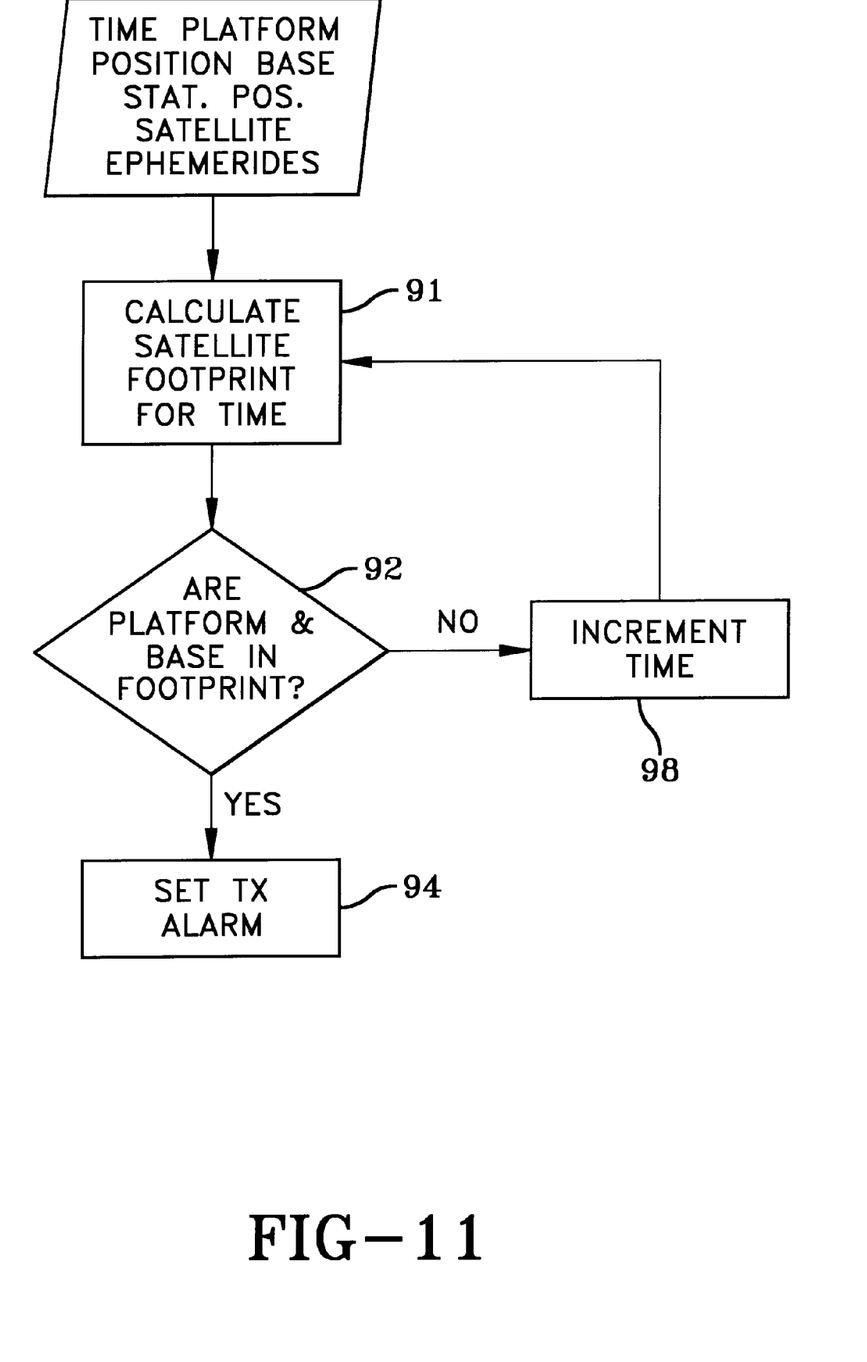
FIG. 11 is a generalized flow diagram showing the steps of determining covisibility of a LEO satellite with a transmitter and receiving station, respectively.

Referring briefly to FIG. 11, signal transmissions from the device 30 to a LEO satellite will not be conducted unless covisibility exists between the selected LEO satellite, the device 30 and the receiving or base station 20, 22, 24. Accordingly, for the particular time in question and the geolocation of the device or "platform" 30 and the geolocation of the station 20, 22, 24 and the satellite ephemeris data or ephemerides, a determination is made as to whether or not covisibility exists, that is whether or not the satellite footprint encompasses both the device 30 and the signal receiving station and, if so, during what period of time such will occur. Step 91 in FIG. 11 indicates calculation of the satellite footprint for a particular time and step 92 indicates the calculation and comparison as to whether or not the platform or device 30 and the base or receiving station are in the footprint. If covisibility exists, then a transmission time is set, as indicated by step 94 in FIG. 11, and a so-called apogee alarm time is set in step 96 in FIG. 10. If for a particular time the device 30 and the station are not covisible to the satellite considered for transmission, a time increment may be considered as indicated at step 98 in FIG. 11 and the calculation of the satellite footprint for that particular incremented time and the determination of covisibility may be carried out again until it is determined that covisibility exists.

In all of the calculations above, beginning after step 85, a comparison is also made with regard to the deployment constraints of the device 30, that is for a particular heading of the ship 72 and the contour of visibility of the device 30, all of the calculations of determining satellite apogee and covisibility will take into account the limits of visibility imposed on the device 30 by its position relative to signal blocking obstacles, including the ship superstructure 74, 76 and the ship heading and its effect on visibility. Of course, if the position of device 30 is such that visibility is also affected by other obstacles, such as the structures indicated in FIG. 7 (for a device mounted on a land vehicle), for example, the visibility contour of the device will be taken into account under those circumstances also. If the satellite elevation and azimuth are such that the current position of the device 30 and station 20, 22, 24 are within a designated footprint of the LEO satellite in question, a satellite apogee alarm time is set as indicated at step 96 in FIG. 10. When the LEO satellite apogee alarm time has been set and visibility at that apogee is confirmed, the elevation and azimuth information regarding the LEO satellite apogee are used to steer the antenna steering mechanism 63 to "point" the antenna 62 at the LEO satellite, as indicated in step 99 in FIG. 10. Once the antenna 62 is properly oriented, geolocation and other message data is transmitted to the LEO satellite from the device 30, as indicated in step 100 in FIG. 10.

After transmission of data, the transmitter 60 may be powered down while the processor 38 records the position of the device 30 at the time of transmission, updates the memory circuits and then calculates another transmission time for the satellite which is currently visible or for the next visible satellite, as indicated by steps 101 and 103, FIG. 9. A transmit time alarm signal for the transmitter 60 is set based on the specified parameters of the mission and the next GPS position fix which will give additional meaningful information to the terminal 22 and the processor 24.

Alternatively, if the only available or only desired LEO satellite to which information is to be transmitted is not within the calculated LEO satellite visibility range or "footprint" then a time tagged bit of information including geolocation data and any related messages is stored in the nonvolatile memory 42, the measurement and calculation interval are repeated at the next wake-up time for the system operating cycle and any stored data is then transmitted when the LEO satellite becomes visible. Again, the optimum next time to communicate through the next LEO satellite is calculated using the latest calculated geolocation, stored satellite ephemeris and footprint data and device deployment constraints. Accordingly, optimal times to communicate with a selected LEO satellite may be periodically determined and stored in a memory circuit of the processor 38 and used as an activation time for transmitter 60 to provide for transmitting signals to a selected LEO satellite.

The processor 38 may also be programmed to transmit the same information more than once to a visible LEO satellite during the period of time that the satellite is visible. For example, information may be transmitted to LEO satellite 16 during the first half of its range of visibility and during the second half of its range of visibility, for example. A typical message may, for example, last less than one second and the message may be transmitted more than once during the visibility of a selected LEO satellite. However, the message may be repeated or retransmitted at a later time to another LEO satellite which has been selected for relay of information to the terminal 22 and the processor 24.

The range of signal transmission frequencies for information transmitted by the transmitter 60 may vary from the low frequency VHF portion of the RF band to microwave frequencies. The signal may be modulated using FM pulse code or spread spectrum techniques. For purposes of discussion herein all such transmissions will be referred to as RF transmissions. The messages are preferably in a digitally encoded format having a preamble, an identifier, and a message portion. These formats may vary from one LEO satellite to the next and formatting information is prestored in the nonvolatile memory 42 along with the ephemeris data for the particular satellite in question.

The foregoing description of the present invention, including the device 30 and the method carried out thereby is believed to be within the purview of one skilled in the art of satellite communications systems based on the description and drawings. Although a preferred embodiment of the system, device and method have been described in detail herein, those skilled in the art will also recognize that various substitutions and modifications may be made without departing from the scope and spirit of the invention as recited in the appended claims.

What is claimed is:

1. A method for communicating geolocation and messages from a device to a receiving station, comprising the steps of:
    a) receiving signals by the device from a position determining system;
    b) determining a geolocation, a speed value, and a heading value of the device from the received position determining signals;
    c) determining automatically and autonomously a visibility reduction based on proximate deployment constraints stored in the device and the device heading value;
    d) determining a visibility time duration when a low earth orbit satellite is visible to both the device and the receiving station by using a current time, the device geolocation, the receiving station geolocation, the visibility reduction, and low earth orbit satellite ephemeris data stored in the device; and
    e) transmitting the geolocation, the speed value, the heading value, and messages from the device to the low earth orbit satellite during the visibility time duration when the low earth orbit satellite is visible to both the device and the receiving station for relay to the receiving station by the low earth orbit satellite.

2. A method according to claim 1, wherein the position determining system is the NAVSTAR/Global Positioning System.

3. A method according to claim 1, wherein the step of determining a geolocation comprises the steps of autonomously determining a longitude value and a latitude value of a position of the device and simultaneously and autonomously determining a time value taken at that position of the device.

4. A method according to claim 1, wherein the step of determining a geolocation comprises the steps of autonomously determining a three-dimensional value of a position of the device and simultaneously and autonomously determining a time value taken at that position of the device.

5. A method according to claim 1, wherein the step of determining automatically and autonomously a visibility reduction comprises the steps of autonomously determining a heading value of the device and deployment constraint elevation angles and associated deployment constraint azimuth angles stored in the device.

6. A method according to claim 1, wherein the step of determining a visibility time duration when a low earth orbit satellite is visible to both the device and the receiving station, and the step of transmitting the geolocation comprise the steps of:
    a) determining a visibility time duration when each of a plurality of low earth orbit satellites is visible to both the device and the receiving station;
    b) selecting a low earth orbit satellite having a selected visibility time duration from the plurality of low earth orbit satellites; and
    c) transmitting the geolocation, the speed value, the heading value, and messages from the device to the selected low earth orbit satellite during the selected visibility time duration when the selected low earth orbit satellite is visible to both the device and the receiving station, for relay to the receiving station by the low earth orbit satellite.

7. A method according to claim 6, wherein the step of selecting a low earth orbit satellite comprises the steps of:
    a) comparing the visibility time duration for each of the plurality of low earth orbit satellites; and
    b) selecting a low earth orbit satellite having a selected visibility time duration and a shortest time interval between a present time and a beginning time of the selected visibility time duration.

8. A method according to claim 6, wherein the step of determining a visibility time duration when each of a plurality of low earth orbit satellites is visible to both the device and the receiving station, comprises the step of determining a time duration for each of a plurality of earth orbit satellites when:
    a) visibility between the device and the low earth orbit satellite is not reduced due to proximate deployment constraints;
    b) an elevation angle of a low earth orbit satellite is greater than a mask angle based on a predicted position of the device; and
    c) a visibility footprint of the low earth orbit satellite indicates a visibility time duration when both the device and the receiving station are contained within the visibility footprint.

9. A method according to claim 1, wherein the step of determining a visibility time duration when a low earth orbit satellite is visible to both the device and the receiving station, and the step of transmitting the geolocation comprise the steps of:
    a) determining a visibility time duration when each of a plurality of low earth orbit satellites is visible to both the device and the receiving station;
    b) selecting more than one low earth orbit satellite having selected visibility time durations from the plurality of low earth orbit satellites; and
    c) transmitting the geolocation, the speed value, the heading value, and messages from the device to the selected low earth orbit satellites during the selected visibility time durations when the low earth orbit satellites are visible to both the device and the receiving station, for relay to the receiving station by the low earth orbit satellite.

10. A method according to claim 1, wherein the step of determining a visibility time duration when a low earth orbit satellite is visible to both the device and the receiving station, and the step of transmitting the geolocation comprise the steps of:
    a) determining a maximum elevation angle and associated azimuth angle for each of a plurality of low earth orbit satellites based on the device geolocation and satellite ephemeris data stored in the device;

b) comparing the maximum elevation angle for each low earth orbit satellite with a device mask angle for each satellite;

c) comparing the maximum elevation angle and associated azimuth angle for each low earth orbit satellite with deployment constraint elevation angles and associated deployment constraint azimuth angles stored in the device;

d) identifying each satellite having a maximum elevation angle that exceeds the device mask angle and deployment constraint elevation angles at corresponding azimuth angles;

e) selecting identified satellites having a maximum elevation angle that exceeds the device mask angle and the deployment constraint elevation angles, and having a visibility footprint that provides visibility to both the device and the receiving station;

f) determining a selected visibility time duration for each selected satellite having a maximum elevation angle that exceeds the device mask angle and the deployment constraint elevation angles, and when the satellite visibility footprint provides visibility to both the device and receiving station; and g) transmitting the geolocation, the speed value, the heading value, and messages from the device to a predetermined number of the selected low earth orbit satellites during the selected visibility time duration for each of the predetermined number of selected low earth orbit satellites.

11. A method according to claim 10, wherein the step of transmitting the geolocation comprises transmitting the geolocation, the speed value, the heading value, and messages from the device to a predetermined number of the selected low earth orbit satellites when each of the predetermined number of selected low earth orbit satellites is at its maximum elevation angle.

12. A method according to claim 10, wherein the step of selecting identified satellites further comprises selecting identified satellites having a shortest time interval between a present time and a beginning time of an identified satellite selected visibility time duration.

13. A method according to claim 10, wherein the step of transmitting the geolocation comprises the steps of:

a) steering an antenna connected to the device to a maximum elevation angle and an azimuth for a selected low earth orbit satellite; and b) transmitting the geolocation, the speed value, the heading value, and messages from the device to the selected low earth orbit satellite during the selected satellite selected visibility time.

14. A method according to claim 1, wherein the step of transmitting the geolocation comprises transmitting the geolocation, the speed value, the heading value, and messages more than once from the device to the low earth orbit satellite when the low earth orbit satellite is visible to both the device and the receiving station, for relay to the receiving station by the low earth orbit satellite.

15. A method according to claim 1, wherein the step of transmitting the geolocation comprises transmitting the geolocation and messages at least once during a first half of the visibility time duration, and at least once during a second half of the visibility time duration.

16. A method according to claim 1, wherein the step of receiving signals by the device comprises:

a) receiving signals by a receiver in the device from a position determining system at a set of predetermined times; and b) reducing power to the receiver at times between the set of predetermined times.

17. A method according to claim 1, wherein the step of transmitting the geolocation comprises:

a) selecting a transmitter power level;

b) transmitting the geolocation, the speed value, the heading value, and messages by a transmitter in the device to the low earth orbit satellite during the visibility time duration when the low earth orbit satellite is visible to both the device and the receiving station, for relay to the receiving station; and c) reducing the transmitter power level at times the transmitter is not transmitting the geolocation and messages.

18. A method according to claim 1, further comprising the step of preprogramming the device with operational parameters.

19. A method according to claim 18, wherein the operational parameters comprise ephemeris data, operating area information, deployment constraint elevation angles and associated azimuth angles, mask angles, identity codes, and transmission data formats for a plurality of low earth orbit satellites.

20. A method according to claim 18, wherein the preprogramming step is performed by downloading the operational parameters to the device from a computer connected to a connector positioned on the device.

21. A method according to claim 1, wherein the step of transmitting the geolocation data further comprises selecting a data rate, modulation format, data format, transmission frequency and signal transmission power level for compatibility with a selected constellation low earth orbit satellites.

22. A method according to claim 1, wherein the step of receiving signals from a position determining system is performed by a receive antenna and the step of transmitting the geolocation is performed by a transmit antenna.

23. A method according to claim 1, wherein the step of receiving signals from a position determining system comprises receiving signals from at least three earth orbit position determining satellites.

24. A method according to claim 1, wherein the receiving station comprises more than one receiving station.

25. A method according to claim 1, wherein the messages includes voice and data information.

26. A method according to claim 1, wherein proximate deployment constraints of the device are spatial areas, defined in terms of deployment constraint elevation angles and deployment constraint azimuth angles, wherein one or more obstacles are present in a fixed positional relationship with respect to the device that will block transmission of geolocation, the speed value, the heading value, and messages from the device to the low earth orbit satellite.

27. A method according to claim 1, wherein the deployment constraints are selected from the group consisting of natural structures, manmade structures, strong electric fields, and strong magnetic fields.

28. A method according to claim 1, wherein the device is deployed on a mobile object.

29. A device for communicating geolocation and messages to a receiving station, comprising:

a) means for receiving signals by the device from a position determining system;

b) means for determining a geolocation, a speed value, and a heading value of the device from the received position determining signals;

c) means for determining automatically and autonomously a visibility reduction based on proximate deployment constraints stored in the device and the device heading value;

d) means for determining a visibility time duration when a low earth orbit satellite is visible to both the device and the receiving station by using a current time, the device geolocation, the receiving station geolocation, the visibility reduction, and low earth orbit satellite ephemeris data stored in the device; and e) means for transmitting the geolocation and messages from the device to the low earth orbit satellite during the visibility time duration when the low earth orbit satellite is visible to both the device and the receiving station, for relay to the receiving station by the low earth orbit satellite.

30. A device according to claim 29, wherein the position determining system is the NAVSTAR/Global Positioning System.

31. A device according to claim 29, wherein the receiving station includes a means for displaying a track depicting the geographical movement of the device.

32. A device according to claim 29, wherein the means for receiving signals from a position determining system comprises an omnidirectional receive antenna connected to a geolocation data and time signal receiver.

33. A device according to claim 32, further comprising a power management means for reducing power to the geolocation data and time receiver at time durations when the signals from the position determining system are not required.

34. A device according to claim 29, wherein the means for determining a geolocation from the received position determining signals comprises:

a) a microprocessor connected to a geolocation data and time signal receiver;

b) a real time clock connected to the microprocessor;

c) a nonvolatile memory connected to the microprocessor for storing control program software for computing geolocation; and d) a computer program stored in the nonvolatile memory for controlling the microprocessor to compute a geolocation.

35. A device according to claim 34, wherein the computer program controls the microprocessor for autonomously computing a longitude value, a latitude value and a time value of the position of the device.

36. A device according to claim 34, wherein the computer program controls the microprocessor for computing a speed value and a heading value of the device motion.

37. A device according to claim 29, wherein the means for determining a visibility time duration comprises:

a) a microprocessor;

b) a nonvolatile memory connected to the microprocessor for storing control program software, low earth orbit satellite ephemeris data, proximate deployment constraint data, and operating area information;

c) a geolocation stored in memory; and d) a computer program stored in nonvolatile memory for controlling the microprocessor to compute a visibility time duration.

38. A device according to claim 37, wherein the computer program controls the microprocessor for computing the visibility time duration using a present time, the device geolocation, the proximate deployment constraint data, a receiving station geolocation, and low earth orbit ephemeris data stored in nonvolatile memory.

39. A device according to claim 29, wherein the computer program controls the microprocessor for determining a visibility time duration when an elevation angle of a low earth orbit satellite is greater than a mask angle and deployment constraint elevation angles, and a visibility footprint of the low earth orbit satellite contains both the device and the receiving station.

40. A device according to claim 29, wherein the means for transmitting the geolocation comprises:

a) a satellite transmitter connected to a microprocessor; and b) a transmit antenna connected to the satellite transmitter.

41. A device according to claim 40, further comprising an antenna steering means connected to the microprocessor and the transmit antenna for steering the transmit antenna to an azimuth angle and an elevation angle.

42. A device according to claim 40, wherein the transmit antenna is an omni-directional antenna.

43. A device according to claim 40, further comprising a power management means for reducing power to the satellite transmitter at times the transmitter is not transmitting.

44. A device according to claim 40, further comprising a means for controlling a data rate, modulation format, data format, transmission frequency and signal transmission power level of the satellite transmitter by the microprocessor.

45. A device according to claim 29, further comprising a message display unit, a power source and an input/output connector.

46. A device according to claim 29, further comprising a means for preprogramming the device by downloading operational parameters to the device from a computer connected to a connector positioned on the device.

47. A system for communicating geolocation and messages from a device to a receiving station, comprising:

a) a position determining system for transmitting position determining signals;

b) a device for:
1) receiving the position determining signals;
2) determining a geolocation, a speed value, and a heading value of the device;
3) determining automatically and autonomously a visibility reduction based on proximate deployment constraints stored in the device and the device heading value;
4) determining a visibility time duration when a low earth orbit satellite is visible to both the device and a receiving station by using a current time, the device geolocation, the receiving station geolocation, the visibility reduction, and low earth orbit satellite ephemeris data stored in the device; and
5) transmitting geolocation, the speed value, the heading value, and messages from the device to a low earth orbit satellite during the visibility time duration;

c) a low earth orbit satellite for receiving the geolocation, the speed value, the heading value, and messages from the device and transmitting such information to a receiving station; and d) a receiving station for receiving the geolocation, the speed value, the heading value, and messages, processing such information, and displaying such information.

48. A system according to claim 47, wherein the position determining system is the NAVSTAR/Global Positioning System.

49. A system according to claim 47, wherein determining geolocation comprises determining a longitude value, a latitude value, and an associated time value of the device.

50. A system according to claim 47, wherein determining geolocation comprises determining a three-dimensional value of the position and an associated time value of the device.

51. A system according to claim 47, wherein determining a visibility time duration is based on low earth orbit satellite ephemeris data, mask angles, proximate deployment constraint elevation angles and associated azimuth angles, maximum elevation angle and associated azimuth angle, satellite visibility footprint, and receiving station location.

52. A system according to claim 47, wherein the low earth orbit satellite comprises a receiver and a transmitter for relaying geolocation and messages from the device to the receiving station.

53. A microprocessor-implemented computer program for communicating geolocation and messages from a device to a receiving station, comprising the steps of:
  a) receiving signals by the device from a position determining system by controlling a geolocation data and time signal receiver;
  b) determining a current geolocation, a speed value, and a heading value of the device from the received position determining signals;
  c) determining automatically and autonomously a visibility reduction based on proximate deployment constraints stored in the device and the device heading;
  d) determining a visibility time duration when a low earth orbit satellite is visible to both the device and the receiving station by using a current time, the device geolocation, the receiving station geolocation, the visibility reduction, and low earth orbit satellite ephemeris data stored in the device; and
  e) transmitting the geolocation, the speed value, the heading value, and messages from the device to the low earth orbit satellite during the visibility time duration when the low earth orbit satellite is visible to both the device and the receiving station, for relay to the receiving station, by controlling transmission of a device satellite transmitter.

54. A microprocessor-implemented computer program according to claim 53, wherein the step of receiving signals by the device by controlling a geolocation data and time signal receiver comprises the steps of:
  a) applying power to the receiver;
  b) activating the receiver for receiving position determining signals;
  c) acquiring position determining signals;
  d) storing the position determining signals in a memory; and
  e) reducing power to the receiver.

55. A microprocessor-implemented computer program according to claim 53, wherein the step of determining a geolocation of the device comprises the steps of:
  a) accessing the position determining signals from the memory;
  b) computing a geolocation from the position determining signals comprising a longitude value, a latitude value, and a time value; and
  c) storing the geolocation in the memory.

56. A microprocessor-implemented computer program according to claim 53, wherein the step of determining a visibility time duration comprises the steps of:
  a) computing a maximum elevation angle and an associated azimuth angle for each of a plurality of low earth orbit satellites based on the device geolocation and satellite ephemeris data stored in memory;
  b) comparing the maximum elevation angle for each low earth orbit satellite with a device mask angle for each satellite;
  c) comparing the maximum elevation angle and the associated azimuth angle for each low earth orbit satellite with deployment constraint elevation angles and associated deployment constraint azimuth angles stored in memory;
  d) identifying each satellite having a maximum elevation angle that exceeds the device mask angle and deployment constraint elevation angles at corresponding azimuth angles;
  e) selecting identified satellites having a maximum elevation angle that exceeds the mask angle and the deployment constraint elevation angles, and having a visibility footprint that provides visibility to both the device and the receiving station; and
  f) determining a selected visibility time duration for a selected satellite having a maximum elevation angle that exceeds the mask angle and the deployment constraint elevation angles, and when the visibility footprint of the selected satellite provides visibility to both the device and the receiving station.

57. A microprocessor-implemented computer program according to claim 53, wherein the step of transmitting the geolocation and messages from the device to the low earth orbit satellite by controlling transmission of a device satellite transmitter comprises the steps of:
  a) applying power to the device satellite transmitter;
  b) setting transmission parameters of the device satellite transmitter comprising data rate, modulation format, data format, transmission frequency, and signal transmission power level;
  c) transmitting the geolocation and messages from the device satellite transmitter to the low earth orbit satellite during the visibility time; and
  d) reducing power to the device satellite transmitter.

58. Computer readable medium containing instructions for performing the steps in the computer program as recited in claim 53.

59. A method according to claim 1, wherein there is no visibility reduction based on proximate deployment constraints stored in the device and the device heading value.

60. A device according to claim 29, wherein there is no visibility reduction based on proximate deployment constraints stored in the device and the device heading value.

61. A system according to claim 47, wherein there is no visibility reduction based on proximate deployment constraints stored in the device and the device heading value.

62. A microprocessor-implemented computer program according to claim 53, wherein there is no visibility reduction based on proximate deployment constraints stored in the device and the device heading.

* * * * *